Nov. 26, 1935.   G. V. McCAULEY   2,022,215
METHOD OF COOLING GLASS
Filed Feb. 28, 1935   2 Sheets-Sheet 2

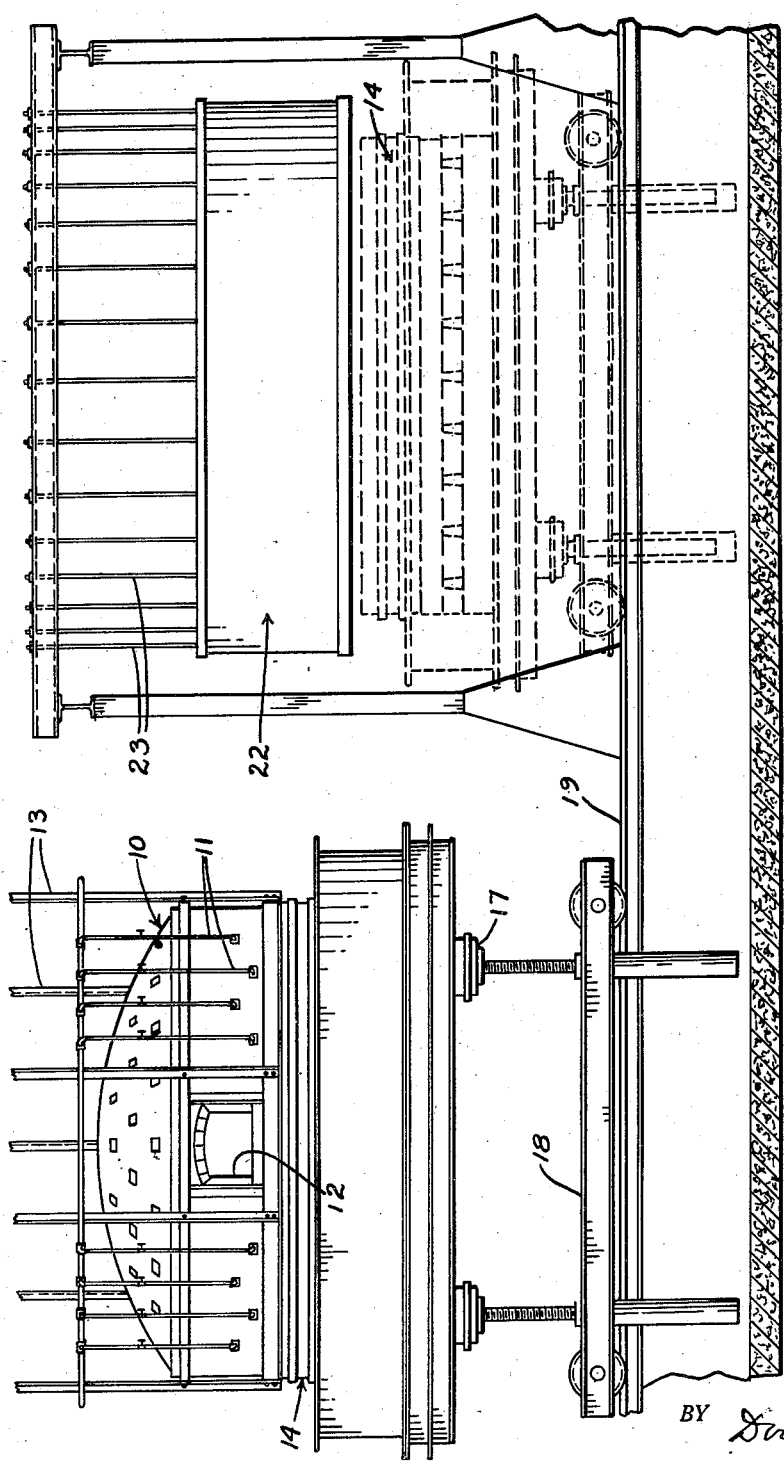

INVENTOR.
GEORGE V. McCAULEY
BY Dorsey & Cole
ATTORNEYS.

Patented Nov. 26, 1935

2,022,215

UNITED STATES PATENT OFFICE 2,022,215

METHOD OF COOLING GLASS

George V. McCauley, Corning, N. Y., assignor to Corning Glass Works, Corning, N. Y., a corporation of New York Application February 28, 1935, Serial No. 8,755

9 Claims. (Cl. 49—89)

This invention relates to a method of cooling large masses of molten glass and has for its principal object to prevent devitrification or crystallization thereof during the cooling.

Another object is to prevent the formation of vacuum bubbles or voids within the body of a large mass of molten glass during cooling.

Most glasses which are high in silica will devitrify or crystallize to some extent at least with separation of crystals of silica if the glass be held for a sufficiently long time within a range of temperatures which will be designated herein as the crystallization range. Such crystallization occurs primarily at or near the surface of the glass and the heterogeneous structure resulting therefrom is particularly objectionable in glass castings which are to be used for telescope mirrors because, when polished, the difference in hardness and expansion coefficient of the silica crystals and the surrounding glass produces a surface which is uneven and which is sensitive to the distortion due to temperature changes.

Rapid cooling through the crystallization range will generally prevent the occurrence of serious devitrification in this range of temperatures and such treatment may successfully be applied to articles which are thin enough to cool at a substantially uniform rate throughout. However, vacuum bubbles sometimes occur in the case of large molten masses which are so thick that, when subjected to rapid cooling, their interior portions do not reach the temperature of solidification until long after the exterior portions have become set and rigid. Therefore, in the manufacture of large glass castings such as a 200 inch telescope mirror, the rapid dissipation of the vast amount of heat which is contained in the molten mass of glass constitutes a serious problem. I have found that the ideal way of cooling such large masses of molten glass down to the temperature at which annealing may be begun would be to cool the interior faster than the exterior, or, in other words, to cool in such manner that the exterior or upper portion of the casting is maintained at a higher temperature than the interior or lower portion which is nearer to the bottom of the mold. Since the refractory mold itself constitutes an insulating medium for the lower part of the casting which prevents it from cooling as rapidly as the upper and exposed portion, the above stated ideal condition appears to be impossible to attain.

In spite of the technical difficulties involved, I have devised a method whereby I am able to cool thick masses of molten glass in a manner which prevents both devitrification and the formation of vacuum bubbles and at the same time dissipates the excess heat rapidly and conveniently.

I have found that I can approach the above mentioned ideal condition in a practicable manner by ladling the molten glass into a relatively cool mold of refractory material so that the lower portion of the casting will impart some of its heat to the mold and will be cooler than the upper portion when the casting is completed. The casting is then permitted to cool rapidly until the surface thereof is congealed and is at a temperature below the softening point but above the annealing point at which temperature the surface is held, if need be, by applying sufficient heat. When the lower portion of the casting has cooled practically to the same temperature the exposed surface is rapidly reheated to a temperature above the softening point of the glass, thereby relieving internal stresses and the casting is further cooled and annealed in the usual manner.

The temperature at which crystallization of the glass occurs most rapidly will depend largely upon the composition thereof and corresponds to the so called liquidus. I have found that for low expansion glasses of high silica content the crystallization range is approximately 1050° C. to 1100° C., while for ordinary glasses of the soda lime or lead type, this range is approximately 935° C. to 950° C. Cooling should proceed as rapidly as possible through the crystallization range and down to the softening point of the glass, which latter is defined as that temperature at which a rod of the glass 1 mm. in diameter and 23 cm. long will elongate by its own weight at the rate of 1 mm. per minute when heated throughout the upper 9 cm. of its length.

As an example of the manner in which my invention is to be carried out, I give the following procedure of casting and cooling a disc having a diameter of 200 inches and a thickness of about 26 inches, which is composed of a high silica glass having an expansion coefficient of .05245, a softening point of about 830° C. and an annealing point of about 520° C., the same being illustrated by the accompanying drawings in which:

Fig. 1 is an elevation of an apparatus for casting and cooling large telescope discs consisting of a heating kiln, a refractory mold and an annealing kiln;

Figure 3:
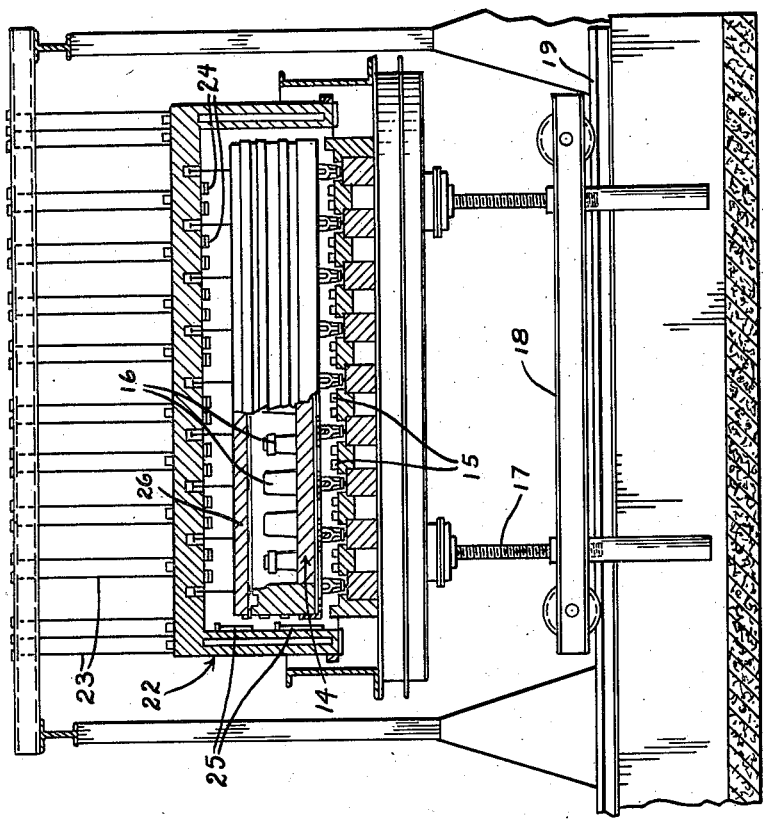
Fig. 3 is an elevation partly in section of the annealing kiln shown in Fig. 1.
Figure 2:
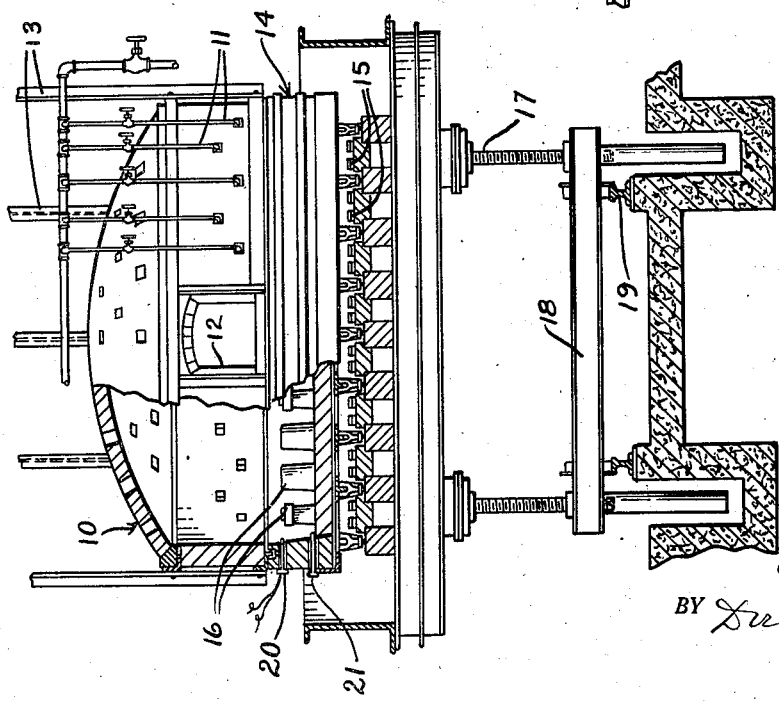
Fig. 2 is an elevation partly in section of the heating kiln and refractory mold shown in Fig. 1.

In the drawings, in which corresponding parts are indicated by corresponding marks of reference, a heating kiln designated generally 10, provided with gas burners 11 and door-opening 12 for introducing ladles (not shown), is suspended by supports 13 directly over a refractory mold designated generally 14. The bottom of the mold 14 is provided with a plurality of built-in electrical heating elements 15 and upwardly-projecting refractory cores 16. The mold is supported upon a four-legged screw hoist 17, which in turn is mounted on a four-wheeled car 18 adapted to move along a track 19. An upper thermocouple 20 projects through the top of the mold wall and a lower thermocouple 21 is inserted through the mold wall at a point lower down so that its hot junction is adjacent the inner surface of the wall near the bottom of the mold.

At a distance of several feet from the kiln 10 and substantially on a level therewith an annealing kiln designated generally 22 is suspended by supports 23 above a continuation of the track 19. The interior of the kiln 22 is provided in its top with a plurality of electrical heating elements 24 and around the wall with heating elements 25. Suspended for vertical movement within and near the top of the kiln 22 is a large refractory mold cover 26 which is slightly smaller in size than the inside of the kiln. The bottom of the kiln 22 is open and is adapted to receive the mold 14, which, on being inserted therein as shown in Fig. 3, will contact and support upon its walls the refractory cover 26, the latter then serving to protect the heating elements 24 from the radiant heat of the molten glass in the mold 14. In this position it will be seen that the mold is entirely surrounded by electrical heating elements.

The refractory mold 14 is preheated in the kiln 10 by means of the burners 11 until the temperature at the upper thermocouple 20 is about 800° C. at which time the temperature of the lower thermocouple 21 is about 650° C. From the tank or melting container heated to about 1550° C. the glass is then ladled into the mold at the rate of about one ladleful or 3 cu. ft. per 4 minutes until the mold is full. The first increments of glass are rapidly chilled by contact with the relatively cool mold and impart some of their heat thereto. The exchange of heat between the glass and the mold continues as more glass is added, the succeeding layers of glass remaining relatively hotter than the lower ones on account of the low thermal conductivity of glass. The temperature of the kiln above the mold also rises as the casting proceeds and, when the temperature, measured by the upper thermocouple 20, reaches approximately 1100° C., the fire in the kiln 10 is reduced by regulating the gas burners 11 so as to maintain this condition until casting is completed. When the mold 14 has thus been filled with the molten glass, the temperature registered by the lower thermocouple 21 is about 900° C. In order to permit the molten glass to settle and fine and to heat the surface thereof above the crystallization point, the fire in the kiln is then increased until such time as the upper thermocouple 20 registers about 1250° C. or higher. At this time the reading of the lower thermocouple 21 is about 1000° C. The fire of the kiln is then completely shut off and the kiln doors opened wide to permit the casting to cool freely and as rapidly as possible. When the kiln above the mold reaches such a temperature that the upper thermocouple 20 registers about 575° C., the kiln doors are closed and the fire is again applied thereto to increase the kiln temperature to about 750° C., or to just below the softening point, as indicated by the upper thermocouple 20. Such rapid cooling causes the upper layer of the casting to congeal and also causes the inner and lower portion thereof to cool more rapidly than would otherwise be possible. The temperature which is indicated by the upper thermocouple 20 is thereafter maintained constant at about 750° C. until the lower portion of the casting, as indicated by the lower thermocouple 21, has cooled approximately to the same temperature and has therefore practically entirely congealed. The shrinkage of the interior of the casting with respect to the exterior, which occurs as solidification proceeds, sets up a condition of tensional stress in the interior and lower portions of the casting which, if maintained as was customary in prior methods, would tend to form vacuum bubbles and also particularly voids in those portions adjacent the cores 16. In order to permit the exterior to yield and to relieve the tensional stress, the fires are again increased and the temperature of the upper portion of the casting, as indicated by the upper thermocouple 16 is raised as rapidly as possible to about 900° C., or well above the softening point. During this flash heating the temperature of the interior portion of the casting is not raised appreciably on account of the low thermal conductivity of the glass and the casting is therefore in the most advantageous condition as regards interior or exterior temperature difference for beginning the annealing treatment. The mold 14 with its casting is then removed from the kiln 10 and transferred to the annealing kiln 22, the bottom of the mold 40 with its heating elements 15 constituting a closure for the bottom of the kiln 22. By means of the heating elements 24, 25, and 15 which are controlled by automatic electrical switches and rheostats (not shown), the casting is further cooled and annealed in the manner known in the art.

Since the difference between the above mentioned crystallization ranges of low expansion, high silica glasses and the average soda lime or lead glasses is about 100 degrees and the difference between their respective softening points is of approximately the same magnitude, it follows that when the above described method of cooling is applied to large castings of lime or lead glass, the temperature points referred to in the description will in each instance be approximately 100 degrees lower than those employed for cooling the low expansion glass. However, on account of the higher expansion of the lime or lead glass, such glasses cannot be so severely chilled as to bring them to a corresponding distance below their softening points because the greater amount of shrinkage which is inherent in these glasses of high expansion tends to cause cracking. Therefore, in the case of such glasses, the lowest temperature to which they are brought prior to the reheating step should be only slightly below their respective softening points.

I claim:

1. The method of cooling a large mass of molten glass, which includes rapidly cooling it through its crystallization range to a temperature below its softening point but above its annealing point, reheating the exposed surface of the mass to permit the exterior to yield and compensate the shrinkage of the interior and annealing the mass.

2. The method of cooling a large mass of molten glass, which includes rapidly cooling it through its crystallization range to a temperature below its softening point but above its annealing point, reheating the exposed surface of the mass to a temperature about 100 degrees above its softening point and further cooling and annealing the mass.

3. The method of cooling a large mass of molten glass, which includes rapidly cooling it through its crystallization range until the exposed surface is at a temperature below its softening point but above its annealing point, holding the external temperature the same until the mass is substantially at the same temperature throughout, reheating the exposed surface to permit the exterior to yield and compensate the shrinkage of the interior and annealing the mass.

4. The method of cooling a large mass of molten glass, which includes rapidly cooling it through its crystallization range until the exposed surface is at a temperature below its softening point but above its annealing point, holding the external temperature the same until the mass is substantially at the same temperature throughout, reheating the exposed surface to a temperature about 100 degrees above its softening point, and further cooling and annealing the mass.

5. The method of cooling a large molten mass of low expansion borosilicate glass, which includes rapidly cooling it through its crystallization range until the exposed surface is at a temperature about 200 degrees below the softening point of the glass, reheating the exposed surface until its temperature is only about 50 degrees below the softening point, holding the external temperature at the latter temperature until the mass is substantially at the same temperature throughout, further reheating the exposed surface to a temperature about 100 degrees above the softening point and cooling and annealing the mass.

6. The method of making a large glass casting, which includes introducing molten glass at a predetermined rate into a relatively cool mold so that the lowermost and interior portions of the casting are cooler than the upper portion, the exposed surface of the finished casting being above the crystallization temperature of the glass, cooling the mass rapidly through the crystallization range to a temperature below the softening point but above the annealing point, reheating the exposed surface to permit the exterior to yield and compensate the shrinkage of the interior and annealing the mass.

7. The method of making a large glass casting, which includes introducing molten glass at a predetermined rate into a relatively cool mold so that the lowermost and interior portions of the casting are cooler than the upper portion, the exposed surface of the finished casting being above the crystallization temperature of the glass, cooling the mass rapidly through the crystallization range until the exposed surface is at a temperature below its softening point but above its annealing point, holding the external temperature the same until the mass is substantially at the same temperature throughout, reheating the exposed surface to permit the exterior to yield and compensate the shrinkage of the interior and annealing the mass.

8. The method of making a large glass casting, which includes successively introducing predetermined amounts of molten glass into a relatively cool mold at such a rate that the lowermost and interior portions of the casting are cooler than the upper portion, the exposed surface of the finished casting being above the crystallization temperature of the glass, cooling the mass rapidly through the crystallization range to a temperature below the softening point but above the annealing point, reheating the exposed surface to permit the exterior to yield and compensate the shrinkage of the interior, and annealing the mass.

9. The method of making a large glass casting, which includes successively introducing predetermined amounts of molten glass into a relatively cool mold at such a rate that the lowermost and interior portions of the casting are cooler than the upper portion, the exposed surface of the finished casting being above the crystallization temperature of the glass, cooling the mass rapidly through the crystallization range until the exposed surface is at a temperature below its softening point but above its annealing point, holding the external temperature the same until the mass is substantially at the same temperature throughout, reheating the exposed surface to permit the exterior to yield and compensate the shrinkage of the interior, and annealing the mass.

GEORGE V. McCAULEY.